Figure 1:
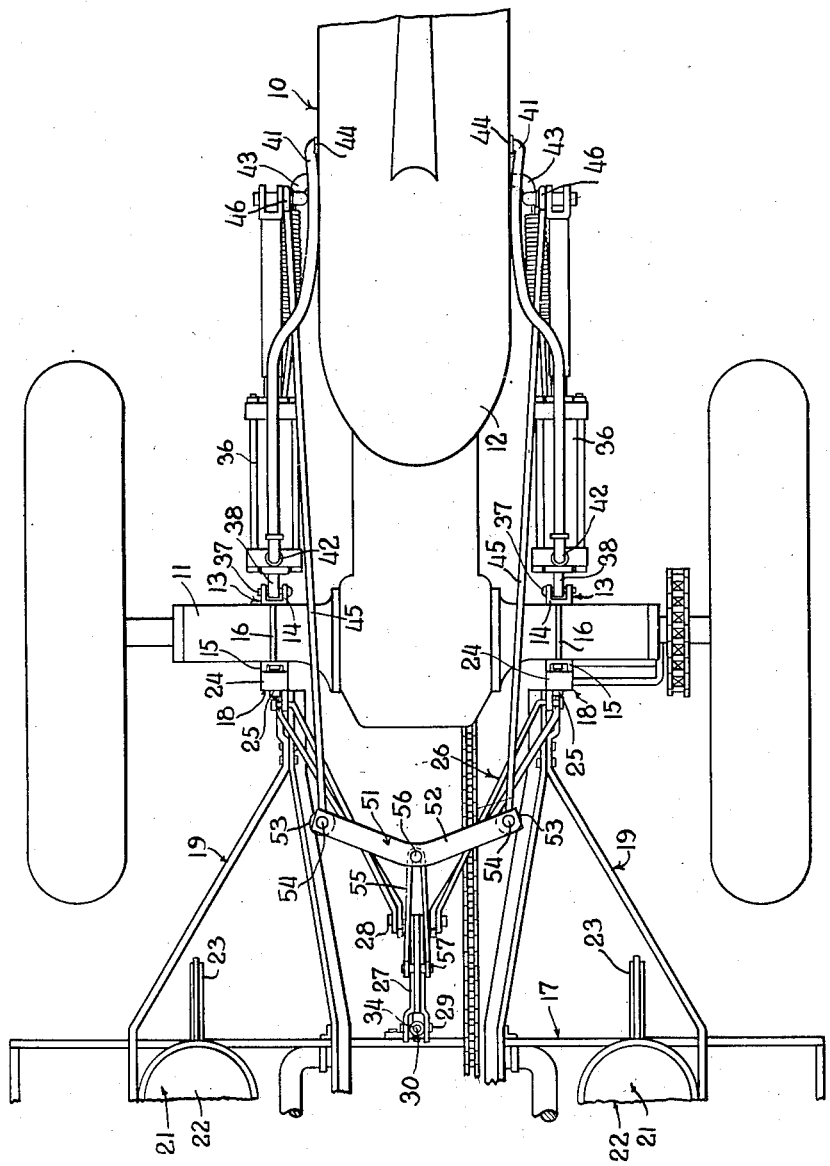

Feb. 8, 1944.   G. M. KRIEGBAUM   2,341,147
AGRICULTURAL IMPLEMENT
Filed Dec. 16, 1940   2 Sheets—Sheet 1

Inventor
George M. Kriegbaum
By Paul Pippel
Atty.

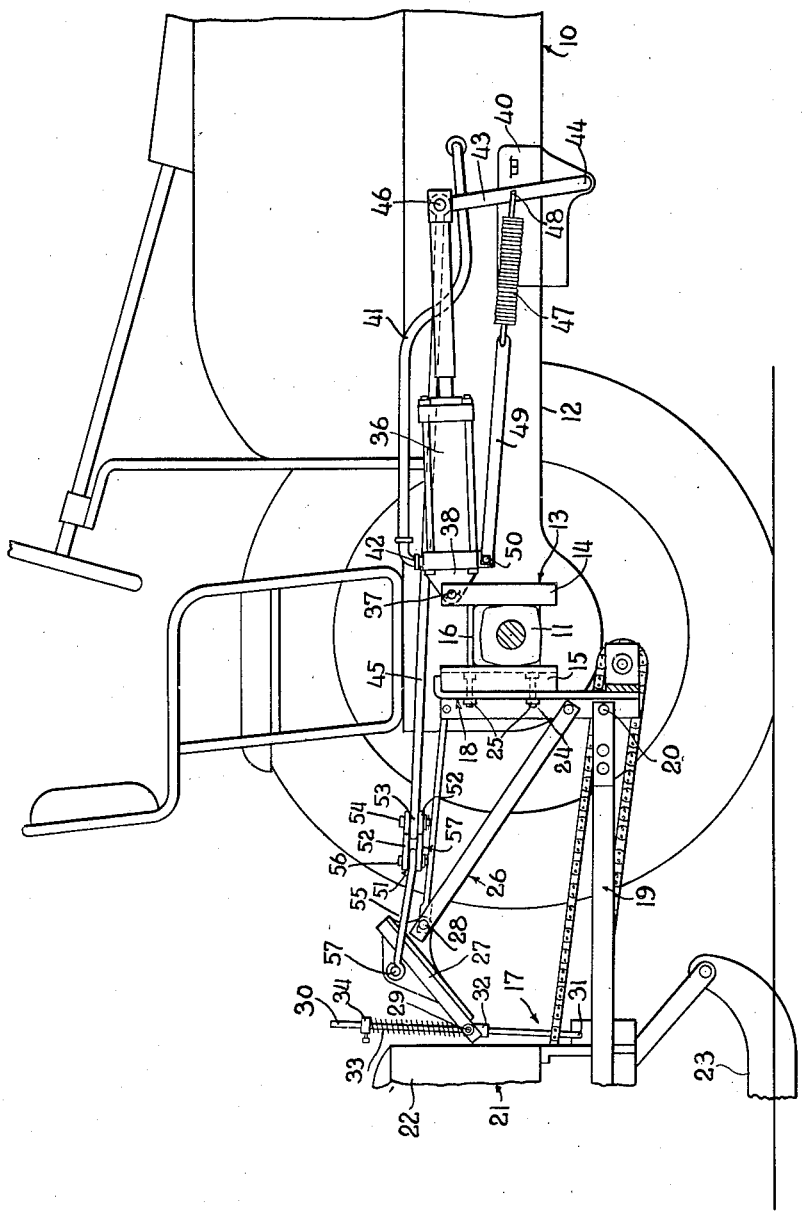

Patented Feb. 8, 1944

2,341,147

UNITED STATES PATENT OFFICE 2,341,147

AGRICULTURAL IMPLEMENT

George M. Kriegbaum, Richmond, Ind., assignor to International Harvester Company, a corporation of New Jersey Application December 16, 1940, Serial No. 370,273

5 Claims. (Cl. 97—50)

This invention relates to agricultural implements, and more particularly to power lifting arrangements for moving working tools to and from their working position.

It is an object of the present invention to provide an arrangement adapted to be included in the linkage connections whereby power from spaced power actuated devices may be delivered to the linkage for the purpose of moving the working tool through the medium of a single connection to the working tool frame.

It is another object of the invention to provide a simplified arrangement for the connecting of power-actuated devices to a working tool frame connected to a tool-supporting means, such as a tractor, and adapted to be moved to and from its working position.

According to the present invention there has been provided an equalizer in the form of a single-tree adapted to be included in the linkage connecting two spaced fluid-actuating fluid devices connected to the tractor for the purpose of delivering power to and from its ground-working position. By the use of this single-tree, the power delivered to the same is equalized and delivered to the remaining part of the lifting linkage to apply thereby a unitary force for effecting lifting of the working tool frame. The connecting point for connection of the equalizer with the working tool frame is intermediate its connections with the respective fluid-actuated devices. The fluid-actuated devices are located respectively at opposite sides of a centrally disposed body portion extending forwardly from a transversely extending axle structure of the tractor. The fluid-actuating devices are located ahead of the tractor axle structure and are adapted to react against the same upon imparting lifting movement to the working tool frame.

For other objects and for a better understanding of the invention, reference may be had to the following detailed description taken in conjunction with the accompanying drawings, in which:

Figure 1 is a plan view of a portion of a tractor and of the implement having the lifting connections embodying the present invention connected thereto; and, Figure 2 is a view in elevation of a portion of the tractor and of the implement attachment with the accompanying power lift connections embodying the features of the present invention.

Referring to the figures, there is shown a tractor indicated generally at 10 having a rear transversely extending axle structure 11 and a centrally disposed, forwardly extending body portion 12. At opposite sides of the rear axle structure 11, there is respectively fixed a bracket structure, indicated generally at 13, including two vertically extending pieces 14 and 15, respectively, fixed to the forward and rearward faces of the rear axle structure by clamping bolts 16. These pieces 14 and 15 are of channel construction and are so connected to the forward and rearward faces of the rear axle structure that the open portions of the channel will face respectively forwardly and rearwardly of the tractor.

To the rear channel pieces 15 is connected a planter attachment indicated generally at 17 and comprising an attaching frame 18 and a tool-carrying frame 19 pivoted to the attaching frame 18 at 20. The tool-carrying frame 19 carries the planting tools 21, which may include a hopper construction 22 and a seed furrow opener 23. These planting tools are well known in the art and further description of the same is believed unnecessary. It is sufficient to say that these planter tools are secured to the planter frame 19.

The attaching frame 18 includes two vertically extending attaching pieces 24 adapted to be attached to the bracket pieces 15 on the tractor by means of bolts 25. The attachment of the pieces 24 to the channel pieces 15 is done in a manner well disclosed in the art.

To the attaching frame 18 there is connected a rearwardly extending, overhanging frame structure, indicated generally at 26, having a rockable lever means 27 pivoted thereto, as indicated at 28. The rearward end of this clamping bolt means and of the rockable means overhangs the planter frame 19, and the rockable means 27 is connected at 29 to the planter frame by means of a vertically extending lifting rod 30 connected to the planter frame, as indicated at 31. The lifting rod 30 extends through a trunnion 32 located at 29 at the rear end of the rockable means 27. The trunnion 32, when the rockable means 27 is rotated in a clockwise direction, may bear against a spring 33 on the lifting rod 30, which in turn bears against a collar 34 rigidly secured to the lift rod 30. This spring 33 will give sufficient cushioning of the planter frame when the same is being carried in transport position on the tractor, and as well when the planter frame is being carried in its planting position.

To each of the pieces 13 on the forward surface of the rear axle structure 11 is connected a fluid power-actuated device 36 adapted to extend along the sides of the central body portion 12 of the tractor. The connection of the fluid-actuated devices 36 to the bracket pieces 14 is by means of a bolt 37 extending through the channel walls of the channel pieces and through a rearwardly extending connecting portion 38 of the fluid-actuated device 36. By this means these fluid-actuated devices are arranged to react against the rear axle structure 11 of the tractor.

These fluid-actuated devices 36 are arranged to receive power from a reservoir and pump housing 40 extending upwardly into the body portion 12 of the tractor. The pump and reservoir housing 40 is of a construction such as shown in the pending application of Carl W. Mott, Serial No. 326,059, filed March 26, 1940, now U. S. Patent No. 2,324,866 granted July 20, 1943. Fluid is taken from the housing 40 by means of hose connections 41 extending through the side walls of the body portion 12 of the tractor and connected to the rear ends of the fluid-actuated devices 36, as indicated at 42. When the flow of fluid from the fluid pump is diverted from its normal flow to the fluid reservoir, fluid will be directed through the hose connections 41 to the fluid-actuated devices. The forward ends of these fluid-actuated devices are supported on fore and aft movable supporting links 43 pivotally connected and carried by the reservoir housing 40, as indicated at 44. As the fluid-actuated devices 36 are extended, the links 43 will pivot in a clockwise direction and take with them the connecting rods 45, respectively connected to the upper ends of the links, as indicated at 46. As a means for closing the fluid-actuated device upon release of fluid from the same, there is provided a spring arrangement 47 connected at one end to the link 43, as indicated at 48, and connected to the rear end of the fluid-actuated device by means of a link 49, the connection of the link 49 being made as indicated at 50.

Coming now more particularly to the principal feature of the present invention, it will be noted that there has been connected to the rear ends of the rods 45 a single-tree or equalizer means 51. This means comprises a pair of vertically spaced strap members 52 between which are disposed eye attaching portions 53 of the respective rods 45. Bolts 54 extend through the openings in the outer ends of the spaced strap 52 and through the eye portions 53.

Intermediate the connections of the rod members 45 with the single-tree means 51, there is connected a hairpin-shaped link member 55. The apex of the hairpin link 55 is disposed between the spaced straps 52 and retained there by a bolt 56 extending through openings in the strap members and through the apex of the link. The rearward ends of the hairpin link 55 are in turn connected to the rockable means 27, as indicated at 57.

It should now be apparent that there has been provided an equalizer arrangement whereby power may be taken from two different sources located at different locations on the tractor and delivered to a single location for the purpose of moving a working tool frame with respect to its supporting means. As the fluid-actuated devices are extended, the power between the same will be equalized by the single-tree means 51, and, by means of the single hairpin link 55, this power is delivered to the rockable means 27 to thereby effect rocking movement of the rockable means about its pivotal connection 28 with the attaching frame 26 of the planter attachment 17. Lifting of the planter frame 19 is effected as the rockable means 27 is rocked in a clockwise direction. The planter frame 19 can be retained in its lifted or transporting position until the fluid is permitted to leave the fluid-actuated device.

While various changes may be made in the detail construction of the present invention, it should be understood that such changes shall be within the spirit and scope of the present invention as defined in the appended claims.

What is claimed is:

1. In combination, tool-supporting means, a working tool connected to the tool-supporting means for movement from one position to another position, power means for moving the working tool including a pair of power-actuated devices, linkage means for connecting the devices to the working tool including equalizer means connected between the respective power-actuated devices, and means for connecting the equalizer to the working tool including a rockable means pivotally mounted upon the tool-supporting means, said rockable means having an arm connected to said equalizer and an integral arm connected to said working tool to effect movement thereof.

2. In combination, a tractor, a tool-supporting frame and means for connecting the same to the tractor for movement to and from its working position, a fluid power arrangement for moving the tool-supporting frame including a pair of fluid-actuated devices adapted to react against the tractor, and linkage means for connecting the fluid devices to the tool-supporting frame including a single-tree means connected between the respective fluid-actuating devices and means for connecting the single-tree means to the tool-supporting frame including movable means mounted on the tractor for movement with respect thereto, said movable means having integral arms projecting therefrom, means for connecting the single-tree means to an arm of said movable means, and means for connecting another arm of said movable means to the tool-supporting frame to effect movement thereof.

3. In combination, a tractor, a planting attachment adapted for connection to the tractor having an attaching frame connected to the tractor and a planting tool frame connected to the attaching frame for movement with respect thereto, a rockable means on the attaching frame having an integral arm connected to the planting tool frame to effect movement thereof, means for rocking the rockable means to effect movement of the planter frame including a pair of power-actuated devices, linkage means for connecting the devices to the rockable means having equalizer means interconnecting the respective power-actuated devices and connected intermediate its length to the rockable means.

4. In combination, a tractor having a transversely extending rear axle structure and a centrally disposed body portion extending forwardly therefrom, a planter frame having a planting tool thereon, means for connecting the planter frame to the rear axle structure of the tractor for vertical movement to and from its planting position, means for moving the planter frame including a pair of fluid-actuated devices, one located at one side of the centrally disposed body portion and the other located at the opposite side thereof, both devices being arranged to react against the rear axle structure of the tractor, linkage means for connecting the devices to the planter frame having single-tree means connected between the respective fluid-actuated devices, and means for connecting the single-tree means to the planter frame including rockable means mounted on the tractor for movement with respect thereto, said rockable means having integral arms projecting therefrom, means for connecting the single-tree means to an arm of said rockable means, and means for connecting another arm of said rockable means to the planter frame to effect movement thereof.

5. In combination, a tractor having a transversely extending rear axle structure and a centrally disposed body portion extending forwardly therefrom, a planting attachment adapted for connection to the tractor having an attaching frame connected to the rear axle structure of the tractor and a planting tool frame connected to the attaching frame for vertical movement to and from its planting position, rockable means on the attaching frame having an integral arm connected to the planting tool frame to effect movement of the same, power means for rocking the rockable means including a pair of fluid-actuated devices, one located at one side of the centrally disposed body portion and the other located at the opposite side thereof, both devices being arranged to react against the rear axle structure of the tractor, and linkage means for connecting the fluid-actuated devices to the rockable means having a single-tree interconnecting the respective fluid-actuated devices and connected intermediate its length to the rockable means.

GEORGE M. KRIEGBAUM.